(12) United States Patent
Brahme et al.

(10) Patent No.: US 6,891,166 B2
(45) Date of Patent: May 10, 2005

(54) MULTI-LAYERED RADIATION CONVERTER

(75) Inventors: Anders Brahme, Danderyd (SE);
Christian Iacobaeus, Värmdö (SE);
Janina Östling, Stockholm (SE);
Vladimir Peskov, Paris-la-Defence Cedex (FR)

(73) Assignee: Ray Therapy Imaging AB, Uppsala (SE)

( * ) Notice: Subject to any disclaimer, the term of this patent is extended or adjusted under 35 U.S.C. 154(b) by 222 days.

(21) Appl. No.: 10/186,716

(22) Filed: Jul. 2, 2002

(65) Prior Publication Data

US 2004/0004190 A1 Jan. 8, 2004

(51) Int. Cl.⁷ .............................................. G01T 1/185
(52) U.S. Cl. .................................. 250/389; 250/370.09
(58) Field of Search ........................... 250/389, 370.09, 250/370.12, 370.14, 580; 378/98.8, 65; 257/428, 429; 313/105 R (56) References Cited

U.S. PATENT DOCUMENTS

| | | | |
|---|---|---|---|
| 4,647,779 A | | 3/1987 | Wong |
| 5,192,861 A | | 3/1993 | Breskin et al. |
| 5,753,921 A | * | 5/1998 | Trauernicht et al. ... 250/370.09 |
| 6,333,506 B1 | | 12/2001 | Francke et al. |
| 2003/0012731 A1 | * | 1/2003 | Suddarth et al. ........... 424/1.49 |
| 2004/0005027 A1 | * | 1/2004 | Nafstadius ................... 378/65 |

FOREIGN PATENT DOCUMENTS

| WO | 99/24848 | 5/1999 |
|---|---|---|
| WO | WO 01/59478 | 8/2001 |

OTHER PUBLICATIONS

Del Guerra et al. "High Resistance Lead Glass Tubing for Rich Counters and for Electromagnetic Calorimeters", *Nuclear Instruments and Methods in Physics Research*, A257, 1987, pp. 609–613.
Cho et al. "A Columnar Cesium Iodide (CsI) Drift Plane Layer for Gas Avalanche Microdetectors", *IEEE Transactions on Nuclear Science*, vol. 45, No. 3, 1998, pp. 275–279.
Park et al. "Moisture Proof Columnar Cesium Iodide (CsI) Layers for Gas Avalanche Microdetectors", *IEEE Transactions on Nuclear Science*, vol. 46, No. 6, 1999, pp. 1938–1942.

* cited by examiner

*Primary Examiner*—Otilia Gabor
(74) *Attorney, Agent, or Firm*—Young & Thompson (57) ABSTRACT

The invention relates to a multi-layered radiation converter, a radiation detector comprising such a converter as well as a radiation-based imaging system using such a detector. Each converter layer (32) in the radiation converter is adapted for interaction with incident radiation to cause the emission of electrons into drift holes defined in the converter layer. The drift holes of one converter layer (32-1) are staggered with respect to the drift holes of another converter layer (32-2). By mutually shifting the converter layers such that the drift holes of two different layers are no longer well-aligned, but rather staggered with respect to each other, the effective conversion area will be increased, and the probability of incoming radiation passing through the stack without interaction with the converter layers will be significantly reduced. In this way, high absorption efficiency for incident radiation inside the multi-layered converter structure is ensured, while still maintaining transparency for emitted electrons through the drift holes.

44 Claims, 10 Drawing Sheets

MULTI-LAYERED RADIATION CONVERTER

TECHNICAL FIELD OF THE INVENTION

The present invention generally concerns radiation converters and radiation detectors, and more particularly the use of such converters and detectors in radiation-based imaging systems for applications such as medical imaging and non-destructive testing.

BACKGROUND OF THE INVENTION

Radiation detectors are used for detection of incoming radiation such as X-rays, gamma photons and charged/uncharged particles, in a wide range of different applications. For detection of photons of various energies, the incoming photons are converted to electrons through electromagnetic interactions, including the photoelectric effect, pair production and the Compton effect. The emitted electrons are normally multiplied by a multiplication structure to produce a multiplicity of secondary electrons and/or photons, which in turn may be detected by a suitable sensor device.

For low-energy photons, gas conversion is very successful with almost 100% efficiency combined with high spatial resolution. However, as the photon energy increases, gas conversion becomes less attractive since the photoelectric capture cross section falls rapidly and the photoelectron range increases. This results in degraded efficiency, as well as heavily deteriorated spatial resolution due to the extended tracks of the long-range electrons.

For higher photon energies, a successful approach is to provide gaseous radiation detectors with a solid converter to increase the probability of electromagnetic interaction with the incoming radiation. Such a converter is needed in order to increase the efficiency since higher energy photons are much more penetrating and would otherwise pass the detector undetected. Compared to non-gaseous detectors, there are several advantages of such an approach, including improved efficiency, low price and larger sensitive area. These advantages have stimulated many researchers to develop gaseous detectors combined with solid converters.

Figure 1:
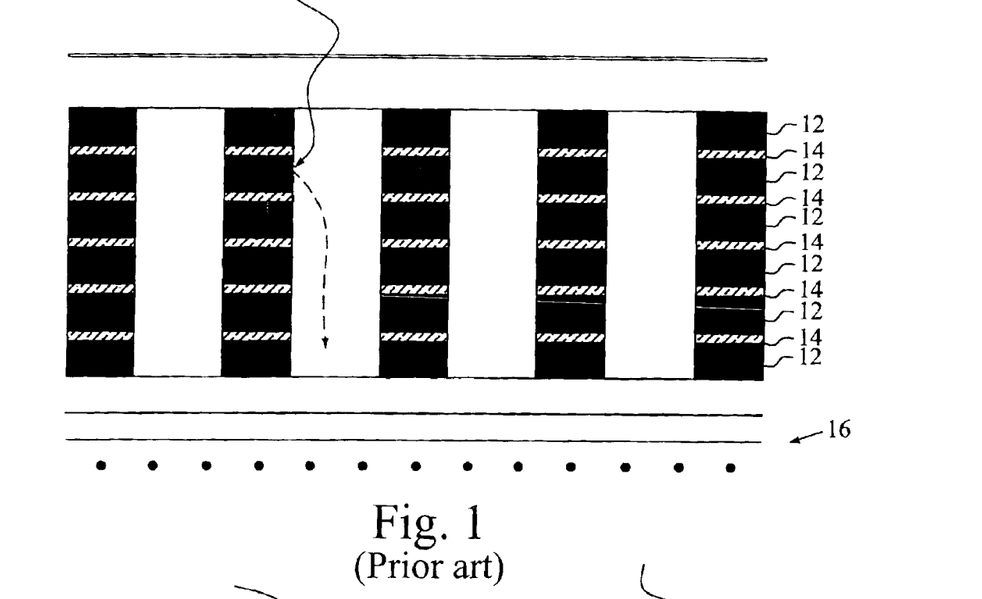
FIG. 1 illustrates a stack of perforated solid gamma converters combined with a multiwire proportional chamber according to the prior art.

Probably one of the first attempts to combine gaseous detectors and solid converters was made by Jeavon et al, as described in the article *The High-Density Multiwire Drift Chamber*, Nuclear Instruments and Methods, 124, 1975, pp. 491–503. Jeavon and his colleagues suggested to use a stack of perforated solid gamma converters combined with a multiwire proportional chamber. As illustrated in FIG. 1, a large number of metal plates (copper) 12 are interleaved with Mylar sheets 14. The complete stack is perforated to form drift holes into which photoelectrons emitted from the copper plates 12 can be released. Secondary electrons resulting from gas ionization in the drift holes are extracted by an electric drift field and detected by a multiwire proportional chamber 16.

In the article *High resistance Lead Glass Tubing for Rich Counters and for Electromagnetic Calorimeters* in Nuclear Instruments and Methods in Physics Research, A257, 1987, pp. 609–613, Del Guerra et al. suggested to use an array of lead glass tubing combined with a multiwire proportional chamber. The lead glass tubing acts as a combined gamma converter and electron drift structure, with the possibility of gas multiplication inside the lead glass capillaries.

However, both of these developments have not received any wide spread use due to the fact that the efficiency of the converters is still relatively low (a few %). The low efficiency is associated with the fact that electrons created by gamma radiation inside the converters have a very short mean free path (normally less than a fraction of a mm). As a result, only electrons created in the converters near the inner walls to the holes or capillaries can penetrate freely into the gas volume.

There have also been attempts to develop gaseous detectors with X-ray converters. As described in U.S. Pat. No. 5,192,861 issued to Breskin et al. on Mar. 9, 1993, a thin flat cesium iodide (CsI) layer was used as a converter. However, the efficiency of the CsI converter layer is also very low for the same reason as mentioned above. In addition, the useful surface of the converter is actually rather small due to the acute angle necessary to obtain a reasonable efficiency. As a result, this type of detector has not gained any practical application.

Figure 2:
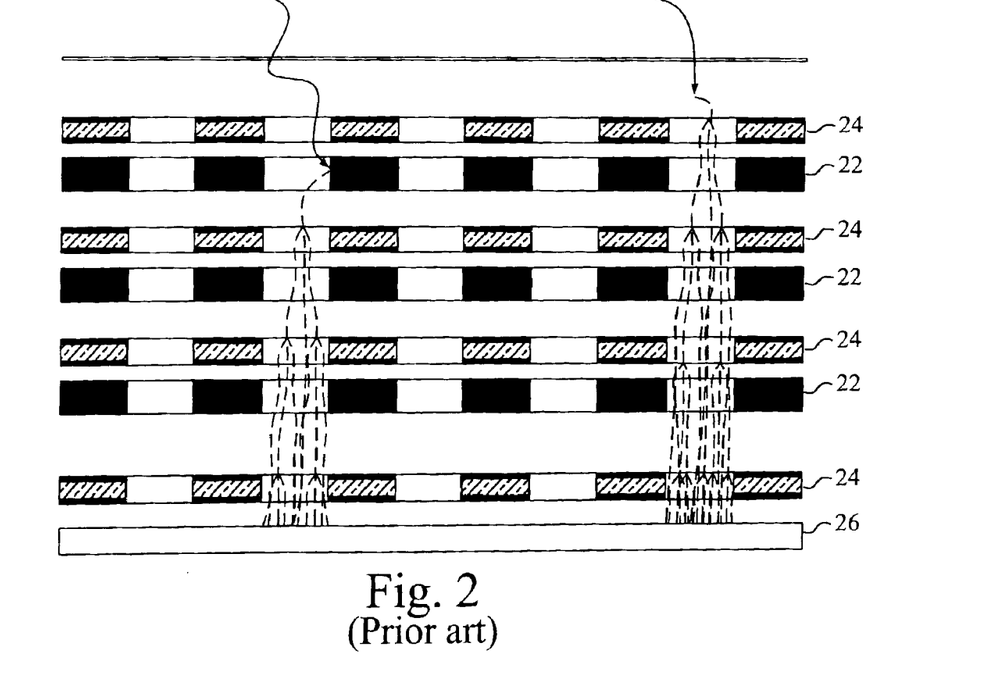
FIG. 2 illustrates a stack of well aligned, alternating perforated gamma converter layers and gas electron multiplier layers according to the prior art.

The approach of combining gaseous detectors with solid converters has recently gained some new interest in the International Patent Application WO 01/59478 by Brahme et al. published on Aug. 16, 2001. The diagnostic and therapeutic detector system proposed by Brahme et al. is intended for imaging with both X-ray and gamma photons, and is based on a stack of well aligned, alternating perforated gamma converter layers 22 and gas electron multiplier layers (GEMs) 24, as schematically illustrated in FIG. 2. The top layer in the alternating stack is preferably a GEM 24 for multiplication of electrons generated in the top gas volume. In the gas volume between the inlet window and the top GEM, diagnostic X-rays will interact with the gas and emit electrons, which are collected and amplified by the GEM structures 24 in the stack. For photons in the radiation therapy beam, the top gas volume will be more or less transparent, and such higher energy photons penetrates into the stack and converts into electrons in the different converter layers 22. High-energy photons of relatively lower energy will predominantly convert in the top converter layers, while photons of relatively higher energy will dominate in the bottom layers. At the bottom, a sensor device 26 is arranged for collection of the electrons or photons resulting from the alternating converter and multiplier stack.

Although the detector system of Brahme et al. constitutes a significant improvement, especially for gamma radiation, the X-ray efficiency and position resolution is still relatively poor due to the large mean free path of the converted electrons in the gas.

Various other attempts to improve the X-ray efficiency in gaseous radiation detectors include using inclined capillaries, as described in U.S. Pat. No. 6,333,506 issued to Francke et al. on Dec. 25, 2001.

SUMMARY OF THE INVENTION

The present invention overcomes these and other drawbacks of the prior art arrangements.

It is a general object of the present invention to improve upon existing solutions to the combined problem of providing high efficiency and high spatial resolution in radiation detectors.

It is an object of the invention to provide an efficient, accurate and reliable radiation converter.

It is also an object of the invention to provide an efficient radiation detector, especially one that allows detection of photons in a broad energy range, including both low energy photons and high-energy photons.

Yet another object of the invention is to provide a radiation-based imaging system having an efficient radiation converter and radiation detector, especially for use in medical systems such as diagnostic and therapeutic systems for cancer treatment.

These and other objects are met by the invention as defined by the accompanying patent claims.

The general idea according to the invention is to use a multi-layered converter, where each converter layer is adapted for interaction with incident radiation to cause the emission of electrons into drift holes defined in the converter layer, and the drift holes of one converter layer are staggered with respect to the drift holes of another converter layer. By mutually shifting the converter layers such that the drift holes of two different layers are no longer well-aligned, but rather staggered with respect to each other, the effective conversion area will be increased, and the probability of incoming radiation passing through the stack without interaction with the converter layers will be significantly reduced. In this way, high absorption efficiency for incident radiation inside the multi-layered converter structure is ensured, while still maintaining transparency for emitted electrons through the drift holes.

For X-rays, at least one of the converter layers comprises a columnar structure in order to increase the probability of electromagnetic interaction of the incident radiation. The columnar structure provides a large number of surface crossings of the incident radiation on its path through the structure, and thus results in efficient conversion of the incident radiation into electrons. Preferably, the columnar structure is formed as a cesium iodide (CsI) layer. Alternatively, the converter layer may be provided with diamond, preferably CVD (Chemical Vapor Deposition) diamond, for improving the conversion efficiency of the incoming radiation into electrons.

Normally, each converter layer comprises an upper electrode and lower electrode separated by an insulating material, with the drift holes being defined through the electrodes and the insulating material. The columnar structure mentioned above, for example a columnar CsI layer, is preferably deposited on at least one of the electrodes and/or on the inner converter walls defining the drift holes.

In general, the incident radiation may be photons of various energies as well as charged and uncharged particles. In the preferred applications, the incoming radiation is in the form of photons, including X-rays and gamma radiation.

For gamma radiation, the interaction mainly takes place in an effective zone adjacent to the inner dielectric walls of the drift holes. The staggered multi-layered converter architecture according to the invention increases the effective surface of these "edges" available for extraction of electrons into gas in the drift holes.

The multi-layered converter stack according to the invention is preferably arranged in connection with a gaseous radiation detector, normally inside the gas chamber of the detector. The overall detector also comprises a sensor device sensitive to radiation representative of the electrons emitted from the converter layers, and arranged to provide an input to electronic signal processing means. For improved performance, the detector may be provided with a multiplication structure, preferably arranged in close vicinity above the sensor device, for avalanche multiplication of electrons and/or photo multiplication of photons to be detected by the sensor device.

The radiation converter and detector according to the invention can be used in radiation-based imaging systems, for example in medical applications or for non-destructive testing.

As indicated above, the multi-layered converter architecture according to the invention opens up for the possibility to convert radiation on very different energy levels in the same converter structure. The basic idea can be taken one step further by combining several individual converter stacks (oriented towards different energy intervals) in the same detector with a common sensor device. By arranging a first stack of mutually staggered converter layers adapted for photons of lower energy such as X-rays, and a second stack of mutually staggered converter layers adapted for photons of higher energy such as gamma radiation in a radiation detector, the same detector can be used for detection of both low and high energy photons. This is of particular interest in medical applications requiring both diagnostic imaging based on ordinary X-rays and portal imaging based on gamma radiation. In cancer treatment for example, this means that it may be possible to obtain a high quality medical X-ray image at the therapy site directly before therapeutic irradiation begins, without the need for replacement of the detection unit. During the subsequent irradiation therapy, the same detection unit can then be used for portal imaging based on the gamma beam.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Throughout the drawings, the same reference characters will be used for corresponding or similar elements.

Figure 3:
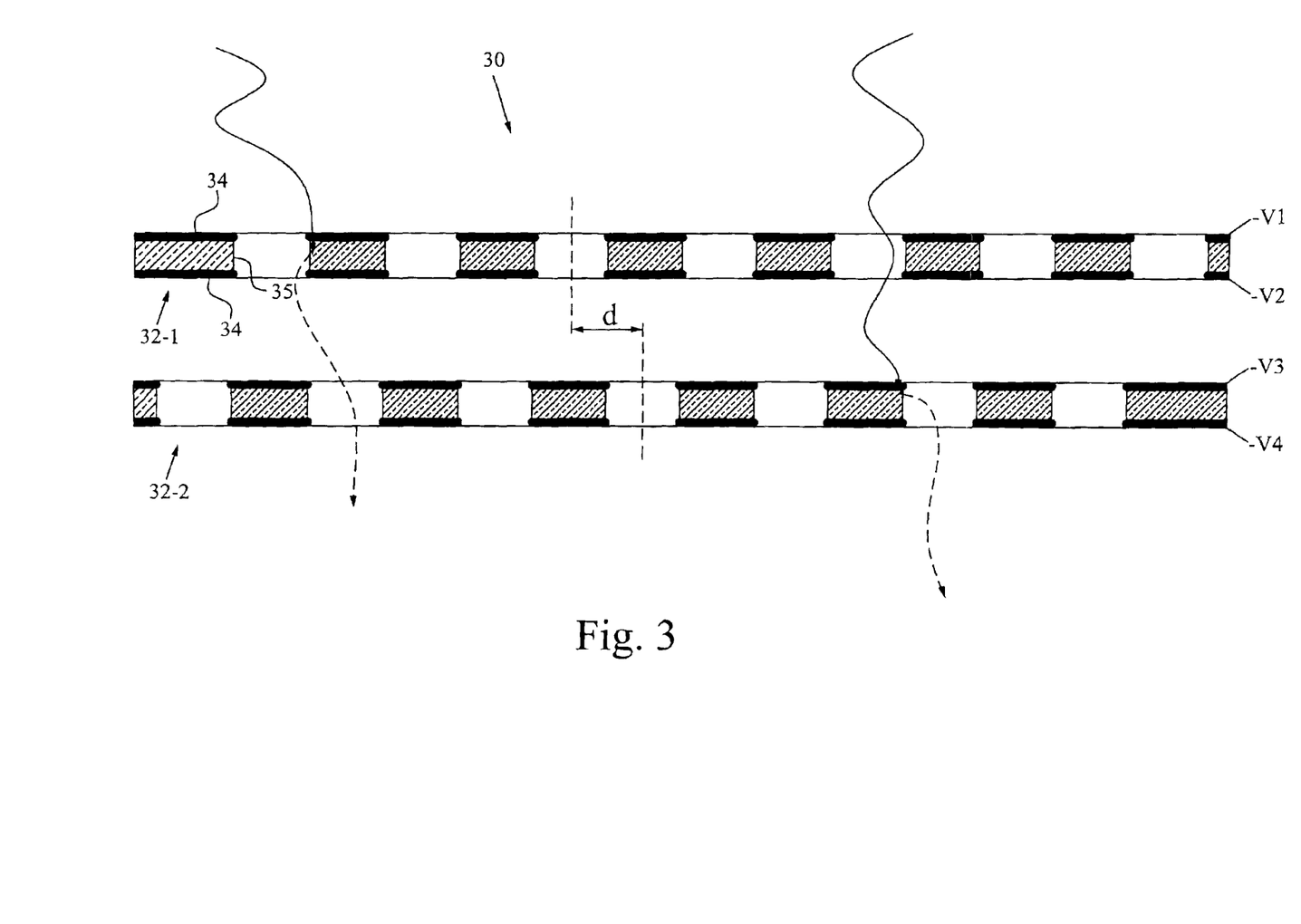
FIG. 3 is a schematic cross-sectional view of a converter stack according to a preferred embodiment of the invention.

FIG. 3 is a schematic cross-sectional view of a converter stack according to a preferred embodiment of the invention. In this particular example, the converter stack 30 comprises two converter layers 32-1 and 32-2, each of which has a number of drift holes defined therein. Each converter layer preferably includes two electrode layers 34 separated by a support structure 35. The support structure 35 is normally made of an insulating material, and the electrode layers 34 may simply be a metallization on both sides of the insulating material. The converter layers 32-1 and 32-2 are preferably arranged in a conventional framework (not shown), possibly using dielectric spacers if required.

The converter stack 30 generally has connection terminals for connecting the converter to an electric field generator for providing an electric drift field in a direction substantially parallel to the extension of the actual stack. Typically, each converter layer has connection terminals for connecting the electrodes 34 of the converter layer in question to respective potential sources (−V1, −V2; −V3, −V4), thus providing an electric drift field over the converter layer and in the drift holes. If $|V1|>|V2|>|V3|>|V4|$, there will also be an electric field between the different converter layers. The drift field may for example be generated by using the resistor chain arrangement described in the above-mentioned International Patent Application WO 01/59478.

The drift holes defined in the converter layer are preferably through-holes extending through the insulating material as well as the electrode metallization. Each converter layer is adapted to interact with incident radiation (indicated by solid curved lines), including photons and charged/uncharged particles, and more specifically X-rays and gamma radiation, to cause the emission of electrons (indicated by dashed curved lines) drifting into the drift holes.

Figure 4:
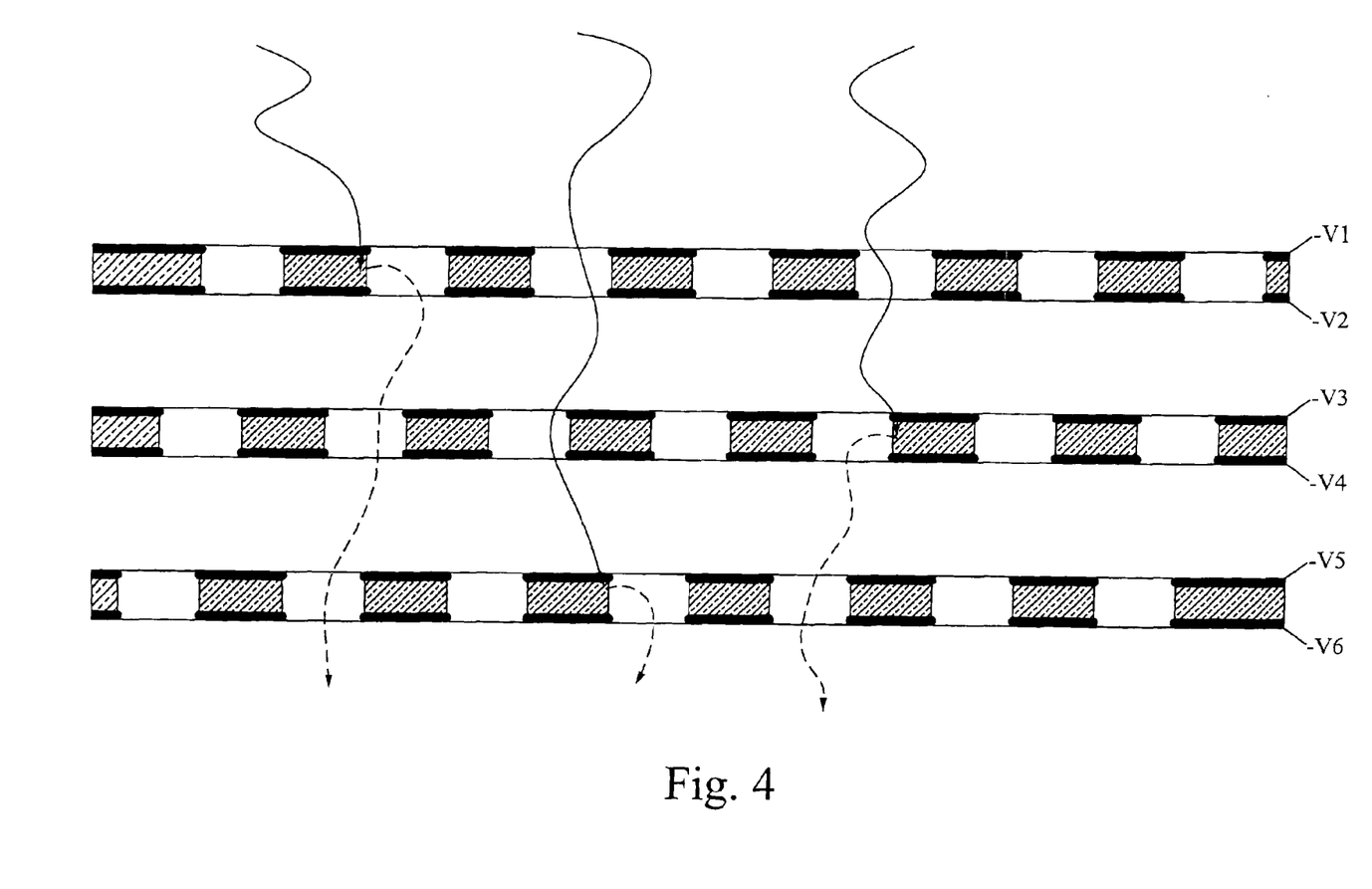
FIG. 4 is a schematic cross-sectional view of a converter stack according to another preferred embodiment of the invention.

By mutually shifting the converter layers such that the drift holes of the two different layers 32-1 and 32-2 are no longer well-aligned, but rather staggered with respect to each other, the effective conversion area will be increased, and the probability that incoming radiation will pass through the stack in the drift holes without interaction with the converter layers will be significantly reduced. The converter layers are thus mutually shifted with respect to each other along the extension of the converter layers themselves, or in other words in a direction substantially perpendicular to the extension of the actual converter stack. The shift distance d may of course vary from application to application, and is typically selected in dependence on the number of converter layers in the stack, as can be appreciated by comparing the converter stacks of FIGS. 3 and 4. The shift distance is often selected to maximize the overlap of the solid parts of the converter layers, thus minimizing the risk that incoming radiation passes through the stack inside the holes. For photons of relatively lower energy, such as X-rays, the staggered converter architecture ensures full absorption of the X-rays inside the multi-layer structure. At the same time, the released electrons can drift through the multi-layer structure almost freely due to the drift field in the drift holes and between the converter layers. The radiation converter is normally arranged in the gas chamber of a gaseous radiation detector. The drift through is additionally facilitated by the diffusion process in the gas gaps between the converter layers. For photons of relatively higher energy, such as gamma radiation, a larger number of converter layers is normally used in the converter stack to ensure high absorption efficiency.

Although the converter layers have been illustrated as being composite with electrodes separated by an insulating support structure, it is actually possible, in a minimalistic implementation, to use a stack of mutually staggered perforated metallic plates and apply an electric drift field over the entire stack to obtain a reasonably efficient gamma converter.

Figure 5:
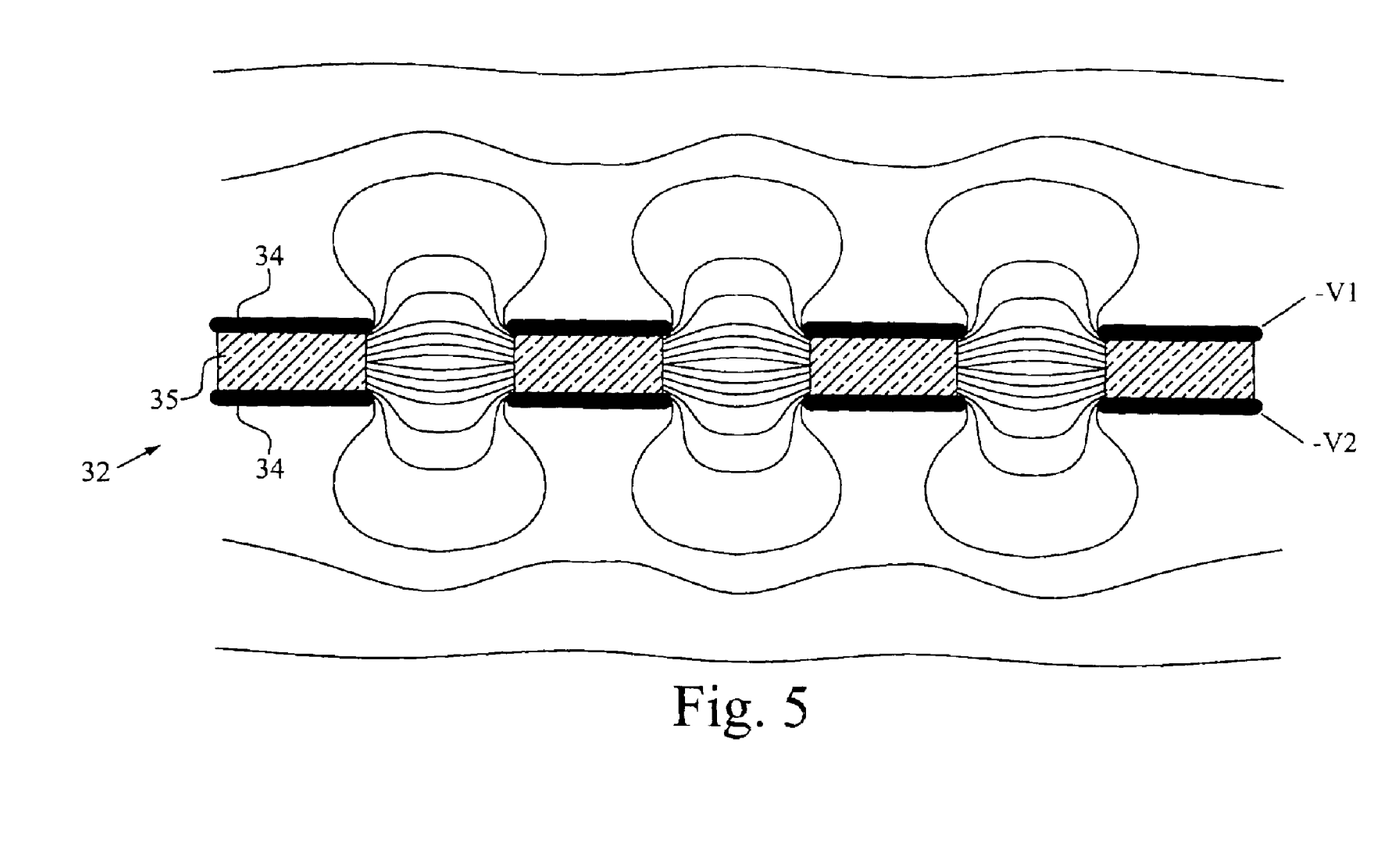
FIG. 5 illustrates the dipole field in association with a single converter layer according to an embodiment of the invention.

FIG. 5 illustrates the dipole field in association with a single converter layer according to an embodiment of the invention. When a potential difference (−V1, −V2) is applied between the electrodes 34 of a converter layer 32, a dipole field will develop in the drift holes defined in the converter layer. The lines shown in FIG. 5 are equipotential lines, and thus the field lines are actually perpendicular to the illustrated lines. Electrons released into the gas will drift towards the high electric field region through the drift holes and focused therein. If desired, it is also possible to explore the gas multiplication process inside the converter layers and/or in the gas gap between them by increasing the potential difference over the converter layers and/or between the layers. It must though be pointed out that gas multiplication inside the converter layers is not a necessary feature. It is clearly sufficient to select a potential difference over the converter layer so as to ensure an efficient drift field.

As indicated above, the converter layers are adapted for interaction with incident radiation to cause emission of electrons. For optimal performance, the converter layers should be customized in accordance with the energy level of the incoming radiation. For X-rays and radiation of similar energy, it has turned out to be very beneficial to use a columnar structure on the converter layer to obtain efficient conversion of incident X-rays into electrons.

By using a columnar structure with multiple columns extending from the converter layer, the probability of electromagnetic interaction of the incident radiation increases since the columns provides a large number of surface crossings of the incident radiation on its path through the structure. This results in efficient conversion of the incident radiation into electrons, and may also give a slight electron multiplication effect as an inherent property of the columnar structure. Preferably, the columnar structure is formed as a cesium iodide (CsI) layer, which is deposited on the converter layer at a suitable location.

Figure 6:
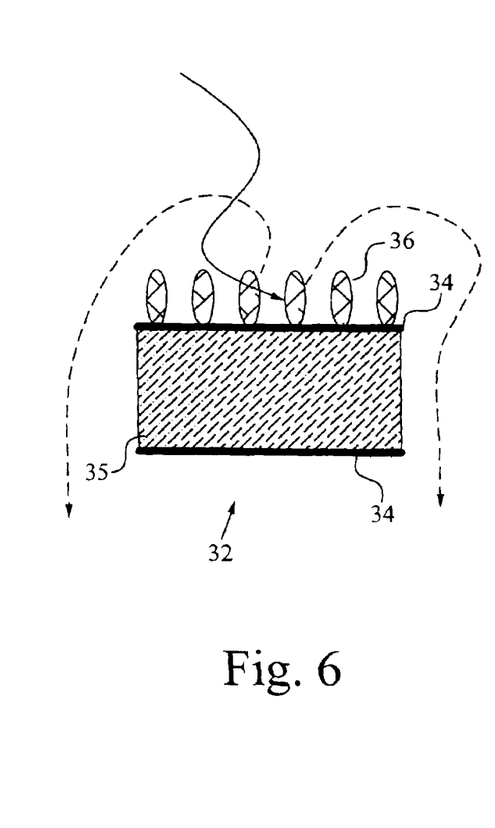
FIG. 6 illustrates a first possible placement of the columnar structure for conversion of radiation of lower energy into electrons.
Figure 7:
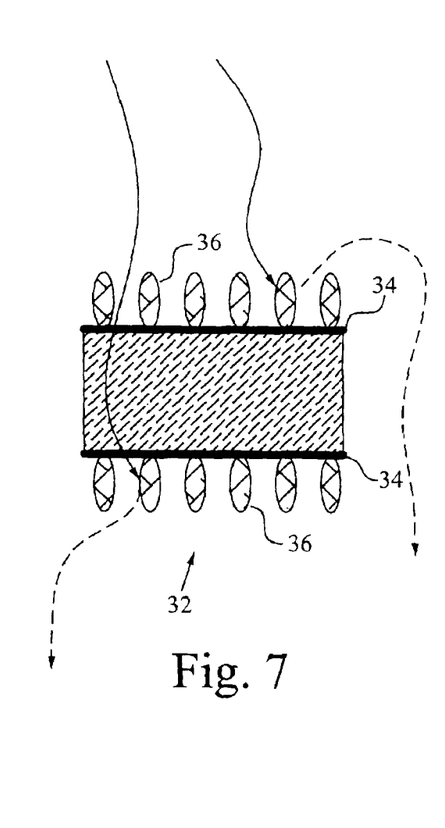
FIG. 7 illustrates a second possible placement of the columnar structure for conversion of radiation of lower energy into electrons.

FIG. 6 illustrates a first possible placement of the columnar structure for conversion of radiation of lower energy into electrons. In this example, the columnar structure 36, such as a columnar CsI layer, is deposited on the upper electrode metallization 34 of the converter layer 32. As schematically illustrated in FIG. 6, the incident X-ray (solid line) may cause the emission of several electrons (dashed lines) due to the larger number of surface crossings. The columnar structure 36 could equally well be deposited on the lower electrode metallization 34, or on both the upper and lower electrode metallization layers as illustrated in FIG. 7.

Figure 8:
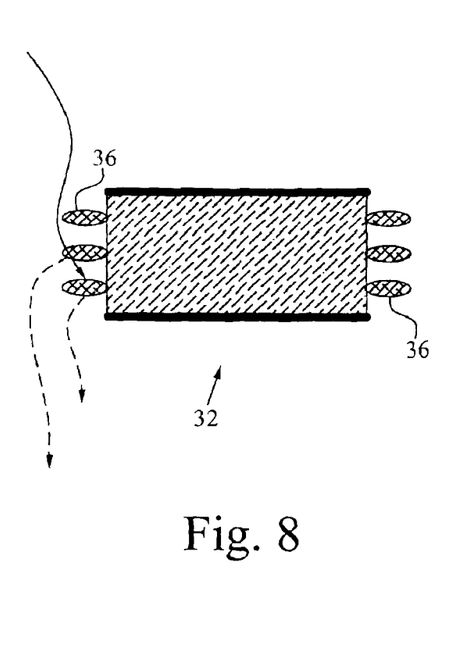
FIG. 8 illustrates a third possible placement of the columnar structure for conversion of radiation of lower energy into electrons.

Alternatively, or in combination with any of the previous locations, the columnar structure 36 may be deposited on the inner converter walls defining the drift holes, as illustrated in FIG. 8.

For more information on columnar CsI layers, reference is made to the articles *Moisture Proof Columnar Cesium Iodide (CsI) Layers for Gas Avalanche Microdetectors* by Park et al., IEEE Transactions on Nuclear Science, Vol. 46, No. 6, December 1999, pp. 1938–1942 and *A Columnar Cesium Iodide (CsI) Drift Plane Layer for Gas Avalanche Microdetectors* by Cho et al., IEEE Transactions on Nuclear Science, Vol. 45, No. 3, June 1998, pp. 275–279. Park and Cho with colleagues suggested to use a columnar CsI drift plane layer as an efficient secondary electron emitter, placing a thin columnar CsI layer on top of the drift plane with Kapton® spacers between the drift layer and the CsI layer.

Figure 9:
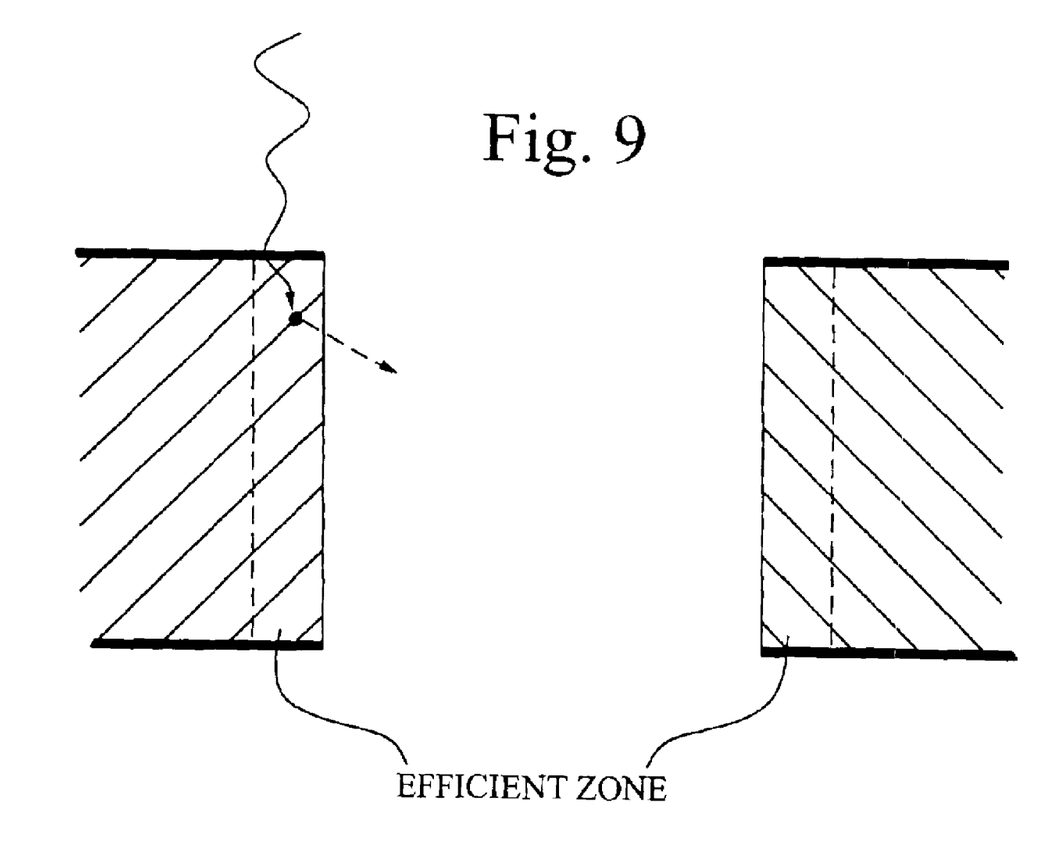
FIG. 9 illustrates the efficient gamma conversion zone in the dielectric converter material.

For gamma radiation, an efficient converter layer could be made of lead glass capillaries, possibly with slightly inclined capillaries, and with suitable metallization for providing the required electrodes. The interaction with incident gamma radiation to cause the emission of electrons into the drift holes mainly takes place in an effective zone in the insulating material adjacent to the inner walls of the drift holes, as illustrated in FIG. 9. The staggered multi-layered converter architecture according to the invention thus increases the effective surface of these "edges" available for extraction of electrons into the gas in the drift holes.

The converter layer (or layers) may be provided with diamond (uniformly or non-uniformly) for improving the conversion efficiency of incoming radiation (especially applicable to X-rays) into electrons. Preferably, CVD (Chemical Vapor Deposition) techniques are used for causing diamond deposition, for example vaporized from methane ($CH_4$) gas. CVD is generally a gas-phase chemical reaction occurring above a solid surface, causing deposition onto the surface. CVD techniques for producing diamond normally require some means of activating gas-phase carbon-containing precursor molecules, for example by maintaining the substrate within a given temperature interval and ensuring that the precursor gas is diluted in an excess of hydrogen.

In the converter layers, CVD diamond may be used as insulating material, for example sandwiched between two electrode layers. For manufacturing, the CVD diamond may be deposited onto a first metal electrode layer, with a vacuum evaporated second metal layer on top of the CVD diamond. Alternatively, it is possible to provide the CVD diamond as a diamond film or coating on one or both of the electrodes and/or on the walls defining the capillary holes. The use of CVD diamond is expected to give a very high yield (~20) of secondary electrons, thus resulting in a very efficient converter structure. Although, the invention mainly concerns multi-layered converters, it should be understood that the CVD diamond feature is applicable also to single-layered converter structures, with a single converter layer including CVD diamond for efficient conversion.

The multi-layered converter architecture according to the invention makes it possible to convert radiation on very different energy levels in the same converter structure. The basic idea according to the invention can be taken one step further by arranging several individual converter stacks oriented towards different energy intervals in the same detector.

Figure 10:
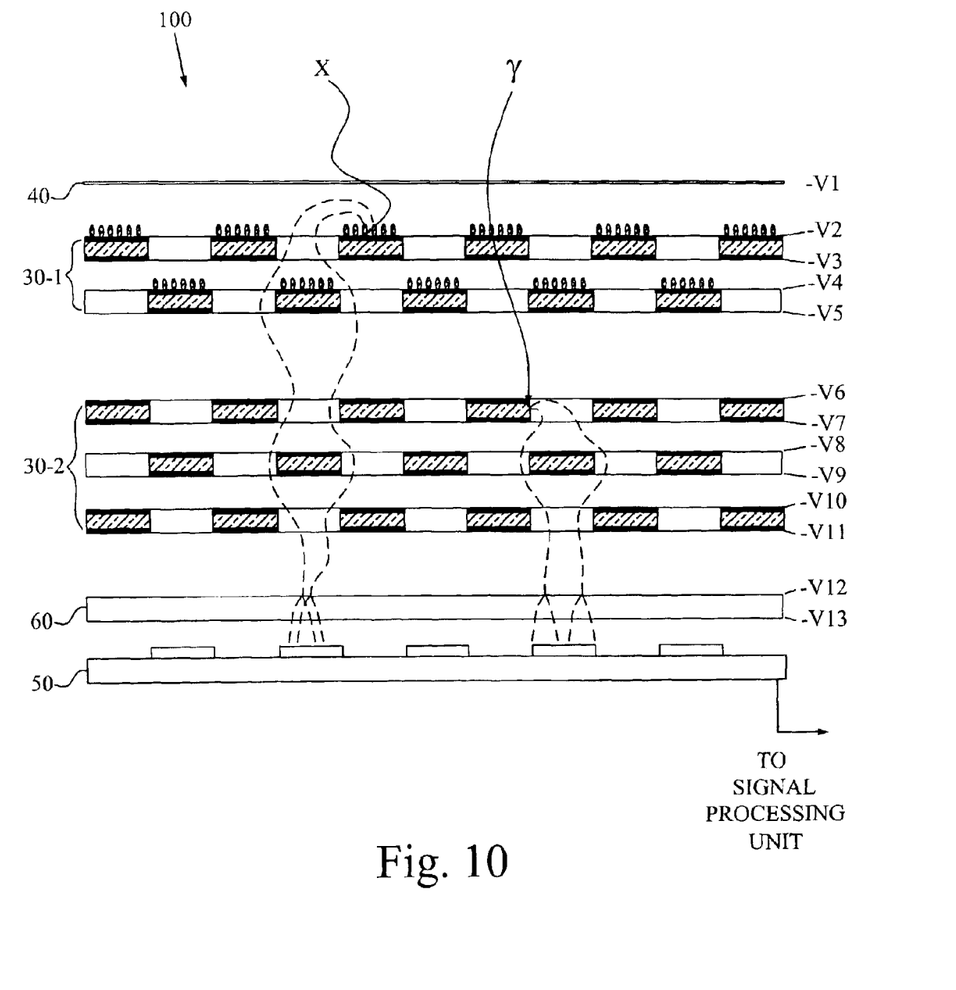
FIG. 10 is a cross-sectional view of an example of a gaseous radiation detector according to a particular embodiment of the invention with two individual converter stacks oriented towards different energy intervals.

FIG. 10 is a cross-sectional view of an example of a gaseous radiation detector according to a particular embodiment of the invention with two individual converter stacks oriented towards different energy intervals.

The radiation detector 100 has a gas chamber in which the converter stacks 30-1, 30-2 are arranged. In operation, the gas chamber is filled with a suitable gas that can be selected from a broad spectrum of possible gases, including noble gases such as Xe, Ar, Kr and Ne, or gas mixtures like $CO_2$ or dimethylalcohol, as well as gas mixtures with quenching gases. The gas mixture may or may not be pressurized, and the gaseous detector may even be operated at subatmospheric pressure.

The detector 100 has an inlet window 40 that is substantially transparent to the incoming radiation, including X-rays and gamma radiation. The detector 100 also comprises a sensor device 50 sensitive to radiation representative of the electrons emitted from the converter layers 30-1, 30-2, and arranged to provide an input to an electronic signal processing unit for signal processing such as signal amplification, A/D-conversion, digital filtering as well as image extraction and image processing.

By arranging a first stack 30-1 of mutually staggered converter layers adapted for photons of lower energy such as X-rays, and a second stack 30-2 of mutually staggered converter layers adapted for photons of higher energy such as gamma radiation inside the gas chamber, the same detector can thus be used for efficient detection of both low and high energy photons. The converter layers in the converter stack 30-1 adapted for X-rays are preferably provided with a columnar structure for efficient X-ray conversion. The number of converter layers in the two converter stacks 30-1, 30-2 may vary from application to application. For medical applications with X-ray imaging and portal imaging, a suitable number of converter layers in the X-ray stack may be 2–5 layers, whereas a suitable number of converter layers in the gamma stack may be 3–10 layers.

When a charge cloud drifts towards the anode, it normally induces a signal on a relatively large anode area (compared to the distance between the anode and the cathodes), resulting in smeared spatial resolution. However, by multiplying the drifting charge, for example by avalanche multiplication, near the anode the effect of the induced charge on the spatial resolution will be negligible compared to the multiplied real charge cloud. Consequently, it is beneficial to use a suitable multiplication structure 60, preferably arranged just above the sensor device 50, for avalanche multiplication of electrons and/or photo multiplication of photons to be detected by the sensor device.

For electron multiplication, any conventional multiplier such as a parallel plate chamber, a multiwire proportional chamber or a gas electron multiplier, may be used. For photo multiplication, it is possible to use any of the above conventional electron multipliers since an ordinary electron avalanche also produces a great number of photons. However, it may be recommendable to use a long capillary hole type multiplier, such as a lead glass capillary structure, operated at a potential difference sufficient for photo multiplication, but still below the threshold for electron multiplication. For efficient photo multiplication, the capillary structure preferably has relatively long capillaries with a capillary length that is many times larger than the capillary diameter.

It is also possible to convert the electron avalanche produced by an electron multiplier into photons by using a fluorescent screen at the bottom of the detector. The electrons incident on the screen will induce emission of photons, which in turn may be detected by a photosensitive sensor device.

The sensor device 50, also commonly referred to as a read-out plate, is thus generally provided as a charge col lecting device or a photosensitive device, depending on whether electrons or photons are to be detected. For example, the sensor device 50 may be a conventional multi-layer printed circuit board (PCB), with a number of charge collecting strips or pads distributed over the top surface of the board for providing position information. The multi-layer PCB has connections to read-out electronics, which in turn provide signal data to a signal-processing unit such as a computer. In the case of a photosensitive sensor device, the position indicating pads or strips may be photosensitive elements, such as photo diodes, connected to the read-out electronics and the signal-processing unit. It is also possible to use conventional CCD (Charge Couple Device) technology, including suitable optics for guiding the photons to the CCD sensor. In applications using high energy irradiation, it should be understood that the detectors need to be highly radiation tolerant, and this has to be taken into account in the design of the detector in general and the sensor device with associated read-out electronics in particular.

The potential difference applied over an individual converter layer and between different layers depends on the thickness of the layers and the distance between the layers. For example, with a layer thickness in the order of 100 microns and an average distance between layers in the order of a few hundred microns, the potential difference over an individual layer could be a few 100 volts, and maybe slightly more between layers. Using the notation of FIG. 10, $|V1|>|V2|>|V3|> \ldots >|V13|$.

Long track electrons, which normally reduce the position resolution, may be electronically excluded from the final image, especially for lower dose rates when individual events may be resolved and selectively removed. The signal-processing electronics may then examine simultaneous signals from neighboring readout pads, and if more than a certain number of pads produce high signals, these signals are excluded so that the corresponding image information does not appear on the final image.

Another way of reducing the contribution of long track electrons is to reduce the space between the converter layers, assuming that the majority of these electrons will be absorbed by the next converter layer before they drift sideways into a drift hole.

A new type of sensor device that can be used by the invention will be described later on with reference to FIGS. 13A–B.

The converter architecture according to the invention enables efficient detection of radiation with energies ranging from a few keV up to hundreds of MeV and higher, using one and the same detector unit.

This is of particular interest in medical applications requiring both diagnostic imaging based on ordinary X-rays and portal imaging based on gamma radiation. In cancer treatment for example, this means that it is possible to obtain a high quality medical X-ray image at the therapy site directly before therapeutic irradiation begins, without the need for replacement of the detection unit. During the subsequent irradiation therapy, the same detection unit can then be used for portal imaging based on the gamma beam.

Figure 11:
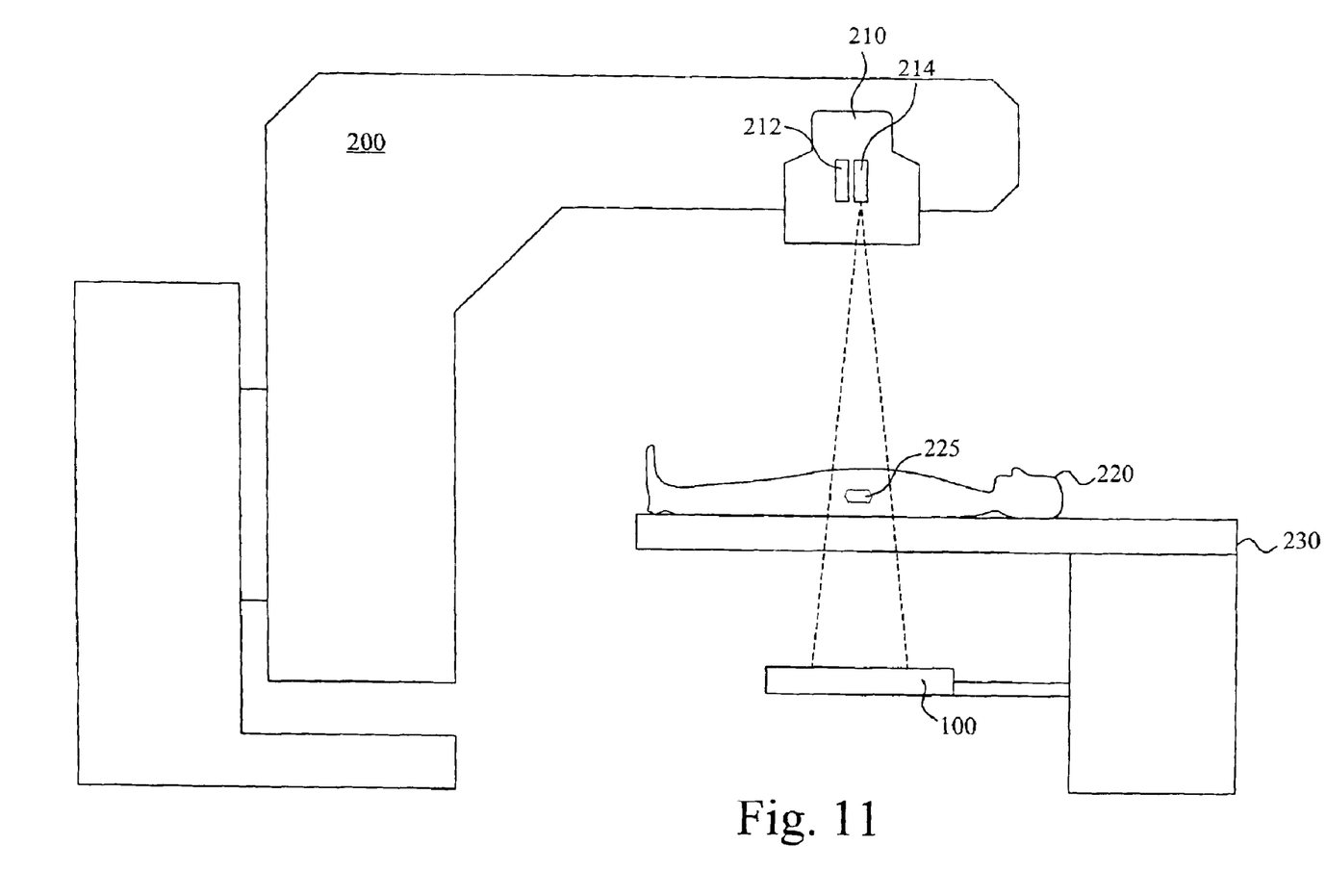
FIG. 11 shows a first radiation therapy set-up in which a radiation detector according to the invention may be implemented.

FIG. 11 shows a first radiation therapy set-up in which a radiation detector according to the invention may be implemented. In this particular embodiment, the therapeutic and diagnostic machine 200 has a radiation head 210 including both a radiation source 212 for therapeutic irradiation and a diagnostic radiation source such as an X-ray tube 214. Naturally, the diagnostic radiation source 212 may alternatively be arranged outside the radiation head 210. A patient 220 is positioned on a couch 230 and a radiation detector 100 according to the invention is placed underneath the patient for detection of both therapeutic radiation for portal imaging and diagnostic radiation for ordinary diagnostic imaging. For diagnostic purposes, the X-ray tube 214 in the radiation head 210 irradiates X-rays (typically 10–150 keV, and more preferably 60–100 keV) towards a specific area of interest in the patient 220. The X-rays are converted in the converter layers adapted for lower energy and the emitted electrons are then drifted towards the multiplication structure and finally detected by the sensor device in the radiation detector 100. During therapy, radiation, such as electrons or gamma radiation, of relatively high energy (typically 1–100 MeV, and more preferably 1–50 MeV) is collimated and irradiated from the radiation source 212 in the radiation head 210 towards a target volume 225 in the patient 220. The therapeutic radiation is converted in the converter layers adapted for higher energy and the emitted electrons are then drifted towards the multiplication structure and finally detected by the sensor device in the radiation detector.

Based on the radiation detected by the sensor device, a computer (not illustrated) connected to the detector 100 provides images of the relevant parts of the patient, preferably illustrating the tumor and target volume. The diagnostic X-ray image, which has relatively high quality and contrast, may be used for initial alignment of the patient on the couch to focus the radiation dose to the tumor, while minimizing the risk of exposing sensitive tissue and organs to the highly energetic therapy beams. The portal images obtained during the actual radiation treatment can be used as a complement to correct the patient set-up, and in principle enable on-line control and verification of the treatment.

Figure 12:
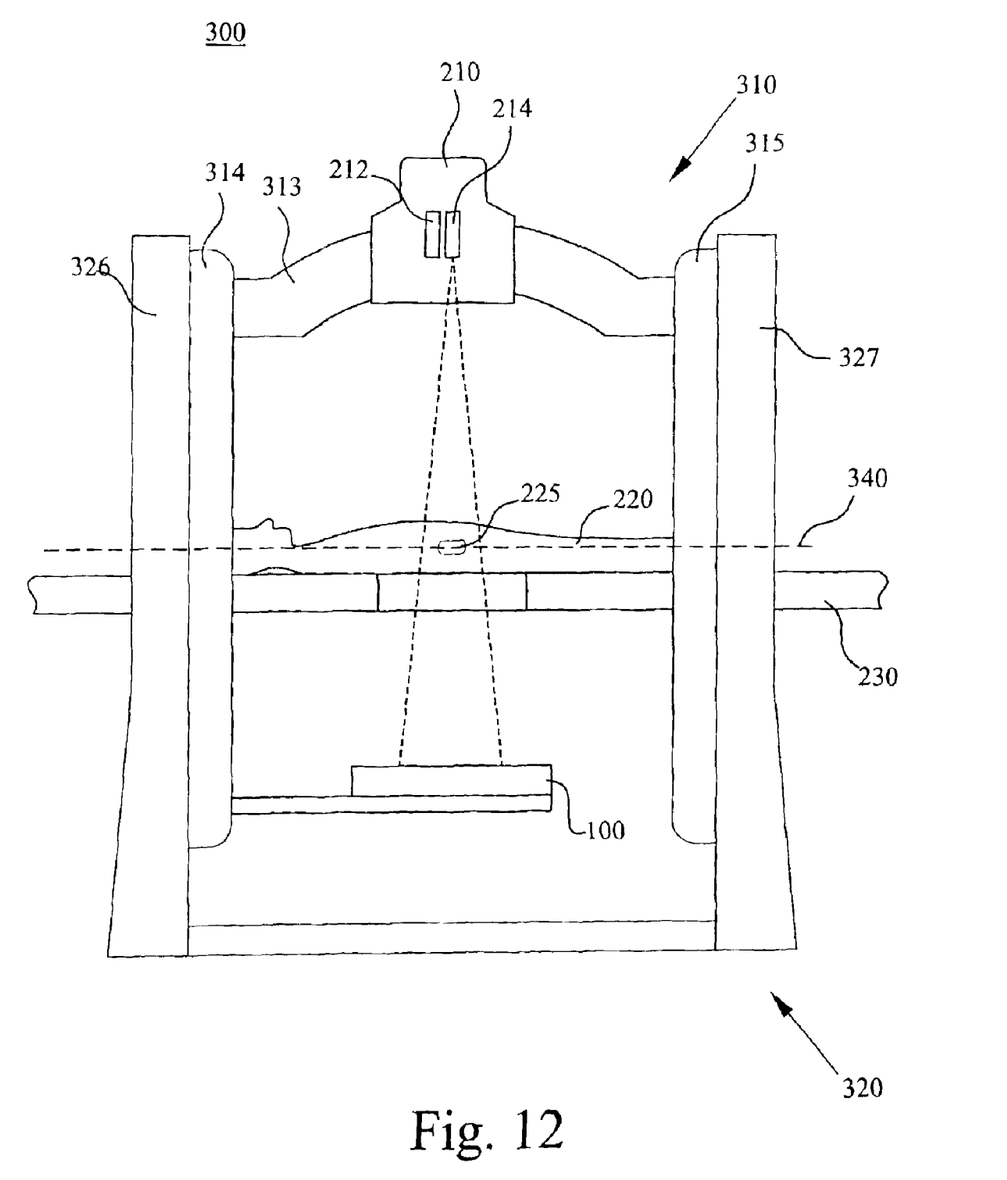
FIG. 12 shows a second radiation therapy set-up in which a radiation detector according to the invention may be implemented.

FIG. 12 shows a second radiation therapy set-up in which a radiation detector according to the invention may be implemented. The set-up of FIG. 12 is particularly adapted for accurate non-coplanar irradiation without involving movement of the patient, as well as for simplified automatic control of the movements of the gantry without risk for collisions with the patient. The basic design of the radiation machine 300 involves the arrangement of an inner gantry part 310 with two supporting locations relative to an outer gantry part 320, with the two supporting locations being placed at each side of the treatment volume of the patient. The inner gantry part 310 comprises in the present embodiment a circular arc portion 313, a first ring portion 314 and a second ring portion 315. A radiation head 210 is mechanically supported by the inner gantry part 301, movable along the arc portion 313 from the first ring portion 314 to the second 315 ring portion. The patient 220 is placed on a couch 230, and a treatment radiation source 212 in the radiation head 210 is arranged to direct a treatment beam or dose package to a target volume 225 in the patient 220. In this particular example, the ring portions 314, 315 of the inner gantry part 310 are situated on either side of the target volume 225. The ring portions 314, 315 are rotatably supported by the outer gantry part 320, comprising a first support portion 326 and a second support portion 327. This design, guarantees that the center of mass of the inner gantry part 310 always is situated between the support locations and therefore a relative low bending moment is present in the gantry. This stable arrangement makes it possible to rotate the inner gantry part 310 relative the outer gantry part 320 around a substantially horizontal rotation axis 340.

The treatment volume 225 is preferably positioned at this rotation axis 340. Thus, since the inner gantry part 310 is rotatable around the rotation axis 340, the treatment radiation source 212 may irradiate the treatment volume 225 from above, below and from either side thereof. In addition, the arc portion 313 and the movable radiation head 210 makes it possible to achieve accurate non-coplanar treatment. By combing the movement of the head 210 along the arc 313 with the rotation of the inner gantry portion 310 around the patient 220, a multitude of irradiation directions is obtained.

By arranging a diagnostic radiation source 214 such as an X-ray tube in the inner gantry part 310, preferably in the radiation head 210, and providing the radiation machine 300 with a radiation detector 100 according to the invention, a complete radiation-based imaging system for diagnostic as well as portal imaging is obtained. For diagnostic imaging, the X-ray tube 214 is operated and the detector 100 with its associated electronic equipment and signal-processing unit provides an X-ray image of the treatment volume that can be used for the initial patient alignment. During radiation therapy, the radiation beams passes through the patient 220, preferably through the target volume 225, and are subsequently detected by the detector 100.

The detector 100 is preferably supported on the inner gantry part 310. By rotating the inner gantry part 310 around the rotation axis 340 and continuously or intermittently irradiating the patient 220 with the X-ray tube 214, images from several different directions around the target volume 225 can be taken. By processing these images using suitable commercially available software, a 3-dimensional CT scan like representation of the patient with the tumor and adjacent tissues, organs and bones may be obtained.

Figure 13A:
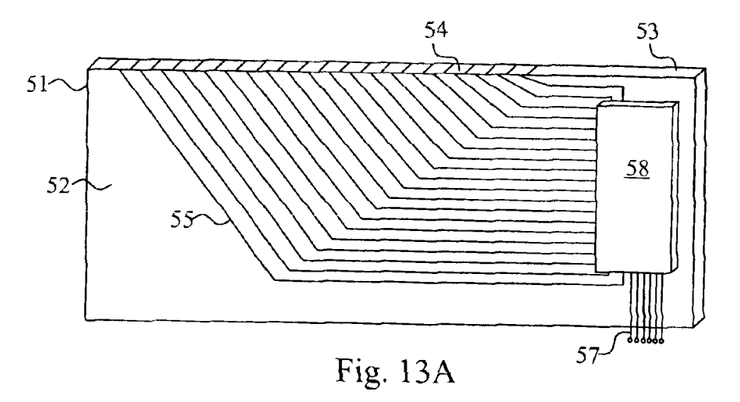
FIG. 13A is a schematic diagram illustrating a printed circuit board according to a preferred embodiment of the invention, with sensor cells arranged along the edge of the board and where the depth of the board is used for connection lines to outside circuitry.

FIG. 13A is a schematic diagram illustrating a printed circuit board according to a preferred embodiment of the invention, with sensor cells arranged along the edge of the board and where the depth of the board is used for connection lines to outside circuitry. The circuit board 51 is defined by two main surfaces 52 and four edge surfaces 53. A row of radiation sensitive elements 54 is arranged at one of the edge surfaces. Typically, connection lines 55 lead from each radiation sensitive element 54 to signal processing means 58, such as an ASIC, preferably without any wire-crossings. The signal processing means 58 is preferably located at the same board 51 as addressed radiation sensitive elements 64 but at a distance therefrom to avoid radiation damages on the sensitive electronics. Read-out connections 57 are provided at the signal processing means 58 to connect the circuit board 51 to external processing means. Thus, with the circuit board design of FIG. 13A, a small surface at the edge portion of the circuit board 51 is used as an area for radiation sensing, whereas the larger main surface 52 is used for the space-demanding wiring and electronics.

Figure 13B:
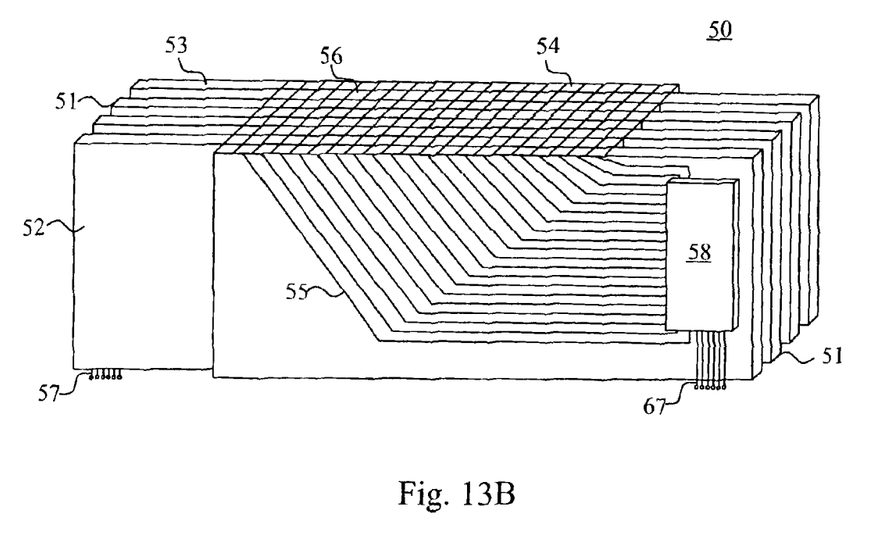
FIG. 13B is a schematic diagram illustrating a radiation sensor device formed by arranging several printed circuit boards of the type shown in FIG. 13A adjacent to each other.

By arranging a number of circuit boards 51 of FIG. 13A adjacent to each other, a radiation sensor 50 is obtained, as is illustrated in FIG. 13B. The boards 51 are preferably placed in a support structure (not illustrated), facilitating removal/insertion of individual boards 51. The boards could also be adhesively attached to each other, e.g. by means of glue, or still differently arranged. In such a way, a sensor surface 56 is formed by the rows of radiation sensitive elements 54. The signal processing means 58 generally protrudes above the main surface 52 of each circuit board 51 and is in a preferred embodiment placed at an end portion of the respective circuit board 51. By arranging the circuit boards 51 such that adjacent boards have their signal processing means 58 at opposite ends, as illustrated in FIG. 13B, and restricting the maximum allowed protrusion of the signal processing means 58 to one circuit board thickness, a compact sensor 50 is formed. Another embodiment achieves a similar advantageous space utilization by arranging the signal processing means of adjacent boards in a non-overlapping way at different heights, instead of at different board ends. The area of the formed sensor surface 56 is preferably in the order of $dm^3$, with the total number of sensitive elements in the order of hundred thousand.

The radiation sensitive elements 54 may be charge collectors, radiation sensitive diodes, e.g. photodiodes, or any other element capable of sensing the radiation reaching the sensor surface. Incident electrons are preferably sensed by pixels made of thin film of a conducting material, e.g. copper. The copper islands can reside charge of the surrounding radiation, which may be collected via the signal processing means 58 at predefined points of time.

The main body of the circuit board 51, is preferably composed of a non-conducting material, such as a polymer material. The connection lines 55 between the individual radiation sensitive elements 54 and signal processing means 58 are for example realized as metal wires. It is desirable to implement a line pattern that uses the main surface 52 of the board 51 as efficiently as possible, preferably without unnecessary crossings.

It should be understood that other geometrical structures of the printed circuit boards 51 may be used. Anyhow, each circuit board is defined by two main surfaces and at least one edge surface, where the area of the edge surface typically is substantially smaller than the area of the main surfaces.

The radiation sensitive elements arranged on the respective circuit board are preferably placed such that, in operation, the edge surface and an active surface of each of the radiation sensitive elements are facing the incident radiation. Advantageously, the radiation sensitive elements are arranged at or in the vicinity of at least one edge surface of the respective circuit board.

Other detector structures are also conceivable according to the present invention, including an amorphous silicon flat-panel detector, preferably adapted for both high and low energy radiation, i.e. treatment and diagnostic radiation, respectively.

The embodiments described above are merely given as examples, and it should be understood that the present invention is not limited thereto. Further modifications, changes and improvements which retain the basic underlying principles disclosed and claimed herein are within the scope and spirit of the invention.

What is claimed is:

1. A radiation converter based on a stack of multiple converter layers, each converter layer being adapted for interaction with incident radiation to cause the emission of electrons into drift holes defined in the converter layer, drift holes of one of said converter layers being staggered with respect to drift holes of another one of said converter layers, thereby ensuring high absorption efficiency for incident radiation, while still maintaining transparency for emitted electrons.

2. The radiation converter according to claim 1, wherein the drift holes of one of said converter layers are staggered with respect to the drift holes of another one of said converter layers in a direction perpendicular to the extension of the converter stack.

3. The radiation converter according to claim 1, wherein at least one of said converter layers comprises a columnar structure for efficient conversion of incident radiation into electrons.

4. The radiation converter according to claim 3, wherein said columnar structure comprises multiple columns extending from the converter layer.

5. The radiation converter according to claim 3, wherein said columnar structure is made of cesium iodide (CsI).

6. The radiation converter according to claim 1, wherein at least one of said converter layers comprises diamond for efficient conversion of incident radiation into electrons.

7. The radiation converter according to claim 1, further comprising connection terminals for connecting the converter to electric field generating means for providing an electric drift field for said electrons in a direction substantially parallel to the extension of said converter stack.

8. The radiation converter according to claim 1, wherein each one of said converter layers comprises an upper electrode and lower electrode separated by an insulating material, said drift holes being defined through said electrodes and said insulating material.

9. The radiation converter according to claim 8, wherein at least one of said converter layers comprises a columnar structure deposited on at least one of said electrodes or on the inner dielectric converter walls defining said drift holes for efficient conversion of incident radiation into electrons.

10. The radiation converter according to claim 8, wherein each converter layer has connection terminals for connecting the electrodes of the converter layer to respective potential sources for applying a potential difference over said converter layer, thus providing an electric drift field in said drift holes defined in said converter layer.

11. The radiation converter according to claim 1, wherein said incident radiation is in the form of photons.

12. The radiation converter according to claim 11, wherein said photons are X-ray photons.

13. The radiation converter according to claim 11, wherein said photons are gamma photons, and the interaction with incident gamma radiation to cause the emission of electrons into said drift holes mainly takes place in an effective zone adjacent to the inner walls of the drift holes.

14. A radiation detector comprising a stack of multiple converter layers, each converter layer being adapted for interaction with incident radiation to cause the emission of electrons into drift holes defined in the converter layer, drift holes of one of said converter layers being staggered with respect to drift holes of another one of said converter layers, thereby ensuring high absorption efficiency for incident radiation, while still maintaining transparency for emitted electrons.

15. The radiation detector according to claim 14, wherein the drift holes of one of said converter layers are staggered with respect to the drift holes of another one of said converter layers in a direction perpendicular to the extension of the converter stack.

16. The radiation detector according to claim 14, wherein at least one of said converter layers comprises a columnar structure for efficient conversion of incident radiation into electrons.

17. The radiation detector according to claim 16, wherein said columnar structure comprises multiple columns extending from the converter layer.

18. The radiation detector according to claim 16, wherein said columnar structure is made of cesium iodide (CsI).

19. The radiation detector according to claim 14, wherein at least one of said converter layers comprises diamond for efficient conversion of incident radiation into electrons.

20. The radiation detector according to claim 19, wherein at least one of said converter layers comprises CVD (Chemical Vapor Deposition) diamond.

21. The radiation detector according to claim 14, further comprising connection terminals for connecting the radiation converter to electric field generating means for providing an electric drift field for said electrons in a direction substantially parallel to the extension of said converter stack.

22. The radiation detector according to claim 14, wherein each one of said converter layers comprises an upper electrode and lower electrode separated by an insulating material, said drift holes being defined through said electrodes and said insulating material.

23. The radiation detector according to claim 22, wherein at least one of said converter layers comprises a columnar structure deposited on at least one of said electrodes or on the inner dielectric converter walls defining said drift holes for efficient conversion of incident radiation into electrons.

24. The radiation detector according to claim 22, wherein each converter layer has connection terminals for connecting the electrodes of the converter layer to respective potential sources for applying a potential difference over said converter layer, thus providing an electric drift field in said drift holes defined in said converter layer.

25. The radiation detector according to claim 14, wherein said incident radiation is in the form of photons.

26. The radiation detector according to claim 25, wherein said photons are X-ray photons.

27. The radiation detector according to claim 25, wherein said photons are gamma photons, and the interaction with incident gamma radiation to cause the emission of electrons into said drift holes mainly takes place in an effective zone of the dielectric converter material adjacent to the inner walls of the drift holes.

28. The radiation detector according to claim 14, further comprising a sensor device sensitive to radiation representative of said emitted electrons and arranged to provide an input to electronic signal processing means.

29. The radiation detector according to claim 28, wherein said sensor device comprises a charge collection device arranged to collect electrons.

30. The radiation detector according to claim 29, wherein said detector further comprises a multiplication structure for avalanche multiplication of said electrons, said charge collection device being arranged to collect said electron avalanches.

31. The radiation detector according to claim 28, wherein said sensor device comprises a photosensitive sensor device arranged to detect photons.

32. The radiation detector according to claim 31, wherein said detector further comprises a multiplication structure for generating photons by photo multiplication in response to said electrons, said photosensitive sensor device being arranged to detect said photons.

33. The radiation detector according to claim 32, wherein said multiplication structure for generating photons by photo multiplication comprises a long capillary hole type multiplier.

34. The radiation detector according to claim 28, wherein said sensor device comprises:
   a number of circuit boards each defined by two main surfaces and at least one edge surface, the area of the edge surface being substantially smaller than the area of the main surfaces;
   a set of radiation sensitive elements arranged at or in the vicinity of at least one edge surface of respective circuit board; and
   connection lines arranged on at least one of the main surfaces of respective circuit board for connecting the radiation sensitive elements to signal processing means;
   whereby the circuit boards are arranged adjacent to each other such that the sets of radiation sensitive elements form a sensor surface.

35. The radiation detector according to claim 28, wherein said sensor device comprises:
- a number of circuit boards each defined by two main surfaces and at least one edge surface, the area of the edge surface being substantially smaller than the area of the main surfaces;
- a set of radiation sensitive elements arranged on respective circuit board such that, in operation, the edge surface and an active surface of each of the radiation sensitive elements are facing the incident radiation; and
- connection lines arranged on at least one of the main surfaces of respective circuit board for connecting the radiation sensitive elements to signal processing means;
- whereby the circuit boards are arranged adjacent to each other such that the sets of radiation sensitive elements form a sensor surface.

36. The radiation detector according to claim 14, further comprising an anode and a cathode for connection to electric field generating means providing an electric field in said detector.

37. The radiation detector according to claim 14, wherein said radiation detector is a gaseous detector and said converter stack is arranged in a gas chamber.

38. The radiation detector according to claim 14, wherein said stack of multiple converter layers comprises a stack of mutually staggered perforated metallic plates over which an electric drift field is to be applied.

39. A radiation-based imaging system having a radiation detector comprising a stack of multiple converter layers, each converter layer being adapted for interaction with incident radiation to cause the emission of electrons into drift holes defined in the converter layer, drift holes of one of said converter layers being staggered with respect to drift holes of another one of said converter layers, thereby ensuring high absorption efficiency for incident radiation, while still maintaining transparency for emitted electrons.

40. A medical system having a radiation detector comprising a stack of multiple converter layers, each converter layer being adapted for interaction with incident medical radiation to cause the emission of electrons into drift holes defined in the converter layer, drift holes of one of said converter layers being staggered with respect to drift holes of another one of said converter layers, thereby ensuring high absorption efficiency for incident radiation, while still maintaining transparency for emitted electrons.

41. A radiation detector comprising:
- a first stack of multiple converter layers, each converter layer being adapted for interaction with incident X-ray photons to cause the emission of electrons into drift holes defined in the converter layer, drift holes of one of said converter layers being staggered with respect to drift holes of another one of said converter layers; and
- a second stack of multiple converter layers, each converter layer being adapted for interaction with incident gamma photons to cause the emission of electrons into drift holes defined in the converter layer, drift holes of one of said converter layers being staggered with respect to drift holes of another one of said converter layers;
- thereby ensuring high absorption efficiency for X-ray and gamma photons, while still maintaining transparency for emitted electrons.

42. The radiation detector according to claim 41, wherein the drift holes of one of said converter layers are staggered with respect to the drift holes of another one of said converter layers in the same converter stack in a direction perpendicular to the extension of the converter stack.

43. The radiation detector according to claim 41, wherein at least one of said converter layers in said first converter stack comprises a columnar structure for efficient conversion of incident X-ray photons into electrons.

44. A medical system having a radiation detector comprising:
- a first stack of multiple converter layers, each converter layer being adapted for interaction with incident radiation of diagnostic energy to cause the emission of electrons into drift holes defined in the converter layer, drift holes of one of said converter layers being staggered with respect to drift holes of another one of said converter layers; and
- a second stack of multiple converter layers, each converter layer being adapted for interaction with incident radiation of therapeutic energy to cause the emission of electrons into drift holes defined in the converter layer, drift holes of one of said converter layers being staggered with respect to drift holes of another one of said converter layers;
- thereby ensuring high absorption efficiency for both diagnostic and therapeutic radiation, while still maintaining transparency for emitted electrons.

* * * * *